United States Patent
Kawashiri

(10) Patent No.: US 8,336,952 B2
(45) Date of Patent: Dec. 25, 2012

(54) WATERPROOF STRUCTURE FOR OUTER ROOF

(75) Inventor: Shinya Kawashiri, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 13/255,485

(22) PCT Filed: Feb. 23, 2010

(86) PCT No.: PCT/JP2010/052699
§ 371 (c)(1),
(2), (4) Date: Sep. 8, 2011

(87) PCT Pub. No.: WO2010/103912
PCT Pub. Date: Sep. 16, 2010

(65) Prior Publication Data
US 2011/0316309 A1 Dec. 29, 2011

(30) Foreign Application Priority Data
Mar. 9, 2009 (JP) .................. 2009-054441
Apr. 30, 2009 (JP) .................. 2009-110856

(51) Int. Cl.
B60R 13/06 (2006.01)
(52) U.S. Cl. .................. 296/190.08; 296/210
(58) Field of Classification Search ............. 296/190.08, 296/190.01, 210
See application file for complete search history.

(56) References Cited

U.S. PATENT DOCUMENTS

| | | | | |
|---|---|---|---|---|
| 3,891,266 | A | * | 6/1975 | Wilfert et al. .................. 362/493 |
| 4,946,219 | A | * | 8/1990 | Okai et al. .................... 296/213 |
| 2010/0283291 | A1 | * | 11/2010 | Bruss et al. ............. 296/190.09 |

FOREIGN PATENT DOCUMENTS

| | | |
|---|---|---|
| JP | 62-055213 | 3/1987 |
| JP | 02-133290 | 5/1990 |
| JP | 07-156827 | 6/1995 |
| JP | 2003-041625 | 2/2003 |
| JP | 2005-104311 | 4/2005 |
| JP | 2005-212666 | 8/2005 |

OTHER PUBLICATIONS

International Search Report for PCT/JP2010/052699, Japanese Patent Office, mailed Apr. 27, 2010 (4 pages).
English Translation of Written Opinion of the International Searching Authority for PCT JP2010/052699, dated Oct. 27, 2011, 7 pages.

* cited by examiner

Primary Examiner — Jason S Morrow
(74) Attorney, Agent, or Firm — Sterne, Kessler, Goldstein & Fox P.L.L.C.

(57) ABSTRACT

A waterproof structure for outer roof includes a sealing plate fixed to an upper frame so as to form a cabin member, a first elastic sealing member sandwiched between the cabin member and the outer roof, and a second elastic sealing member attached to the outer roof. The first elastic sealing member is sandwiched between the outer roof and the cabin member to form a first sealing portion that seals the inner space of the cabin from the outside. A sealing site of the second sealing member is pressed against an outward extending region to form a second sealing portion that seals the inner space of the cabin from the outside at a position outside the first sealing portion. The present invention can enhance waterproof property as well as quality in outer appearance.

6 Claims, 18 Drawing Sheets

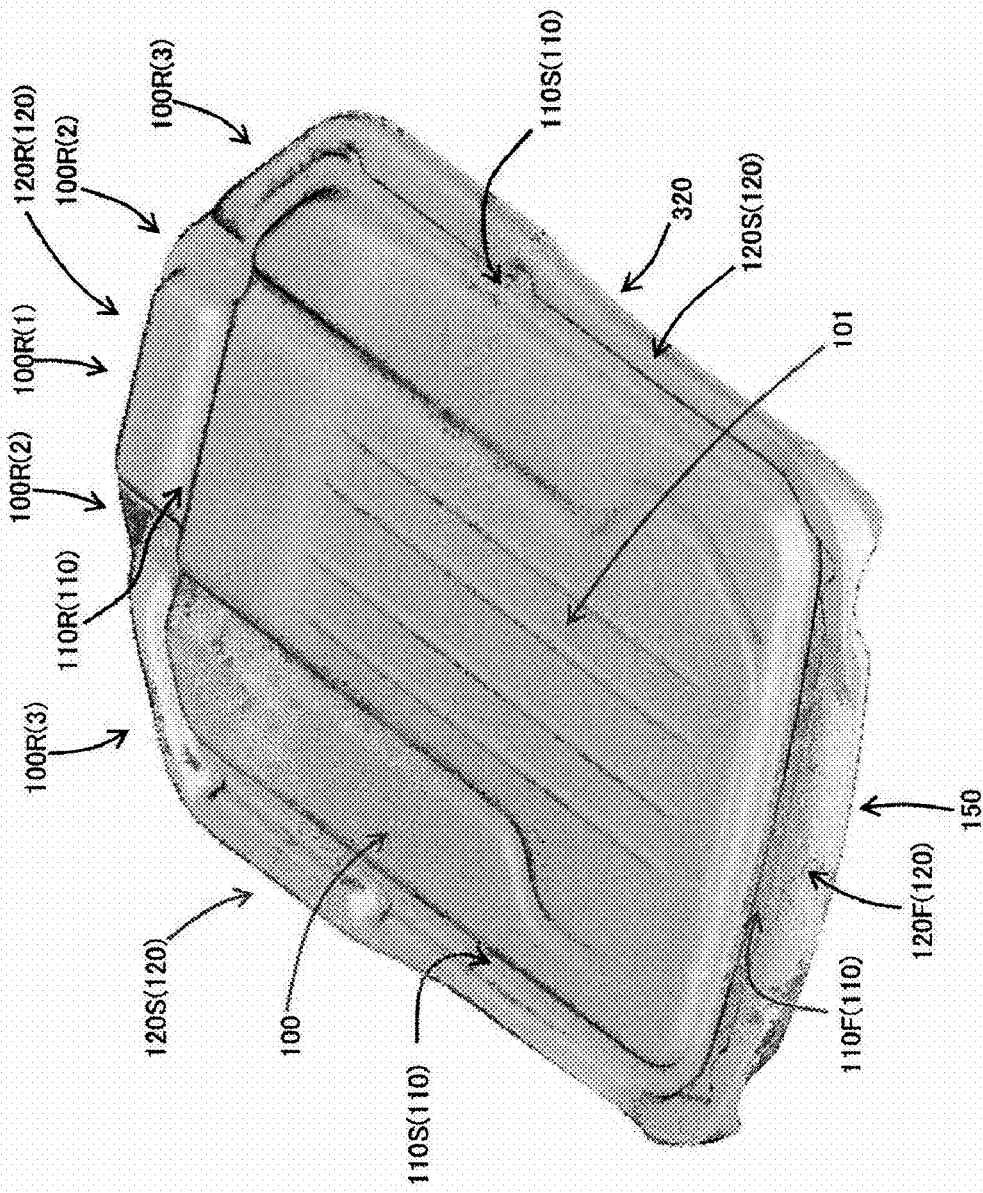

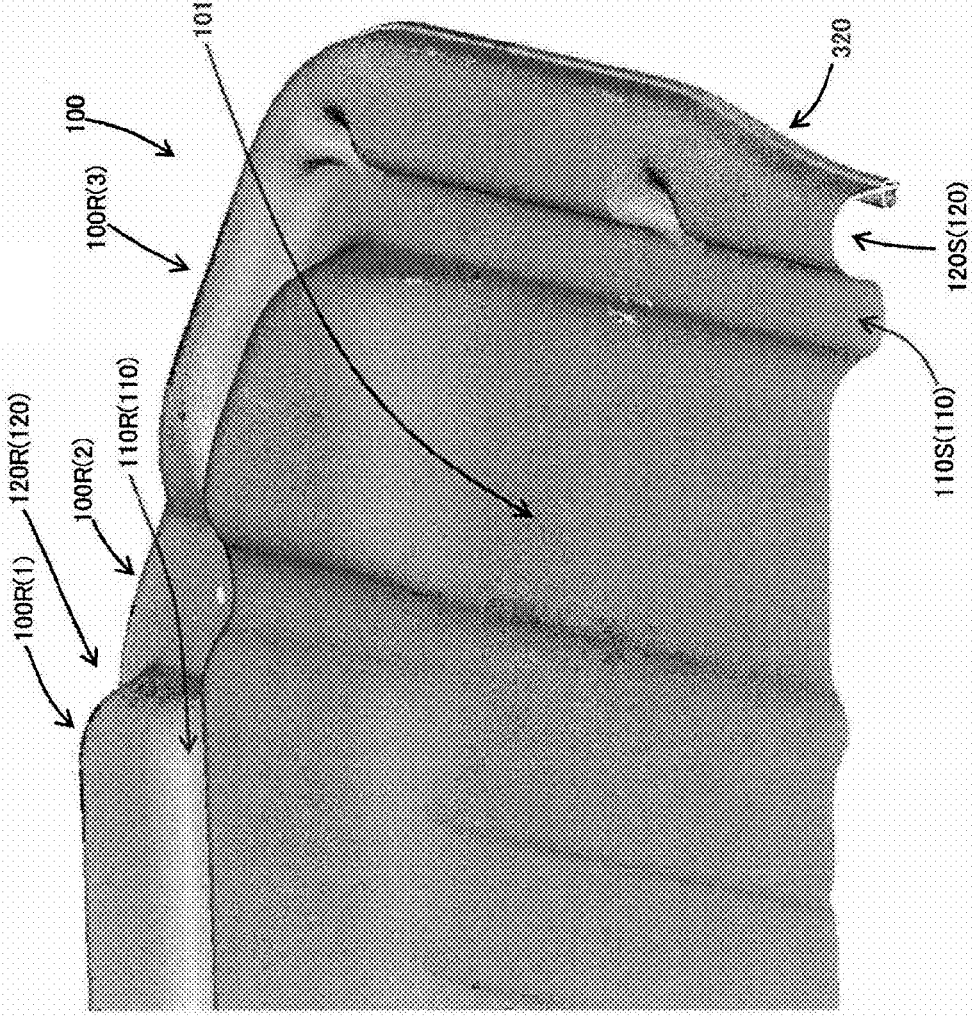

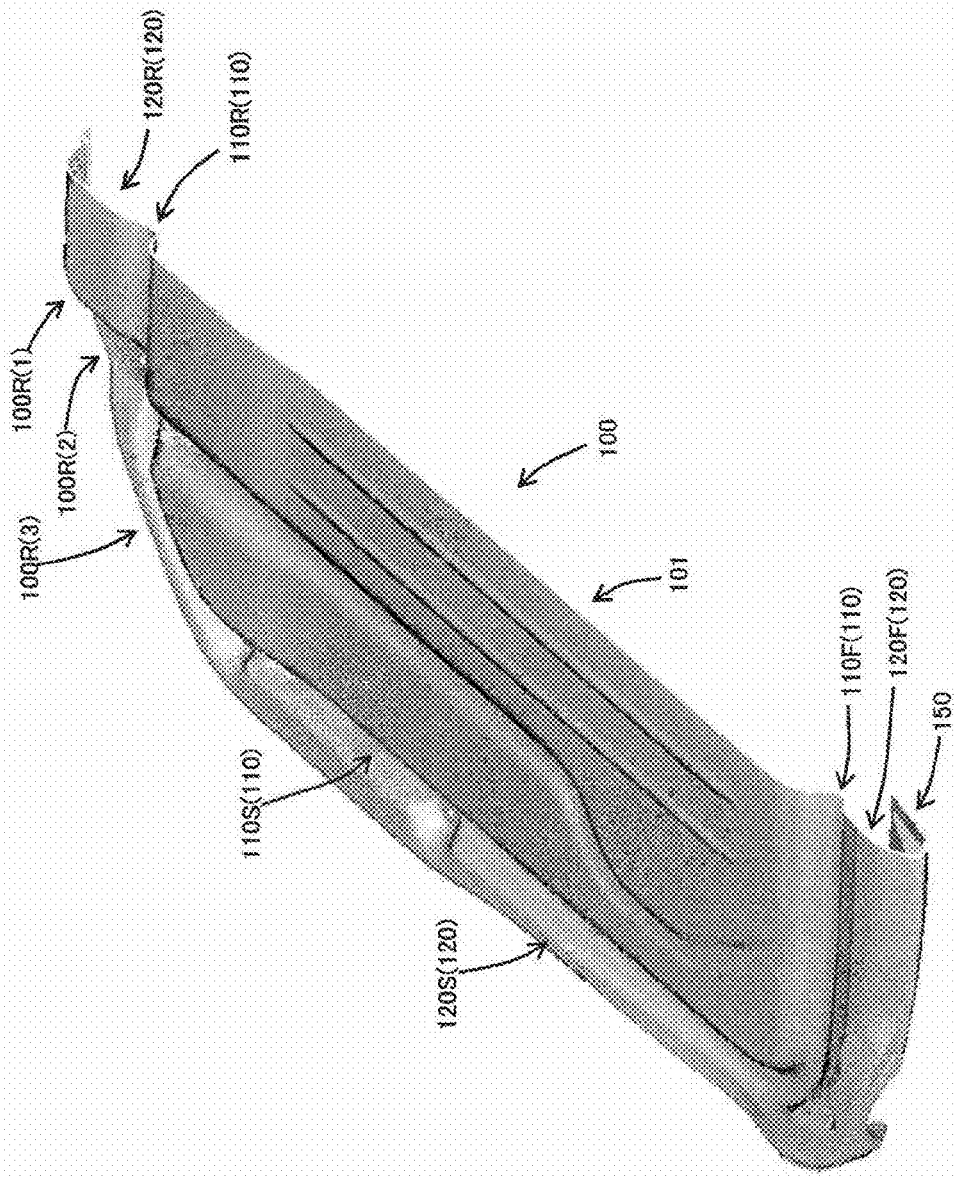

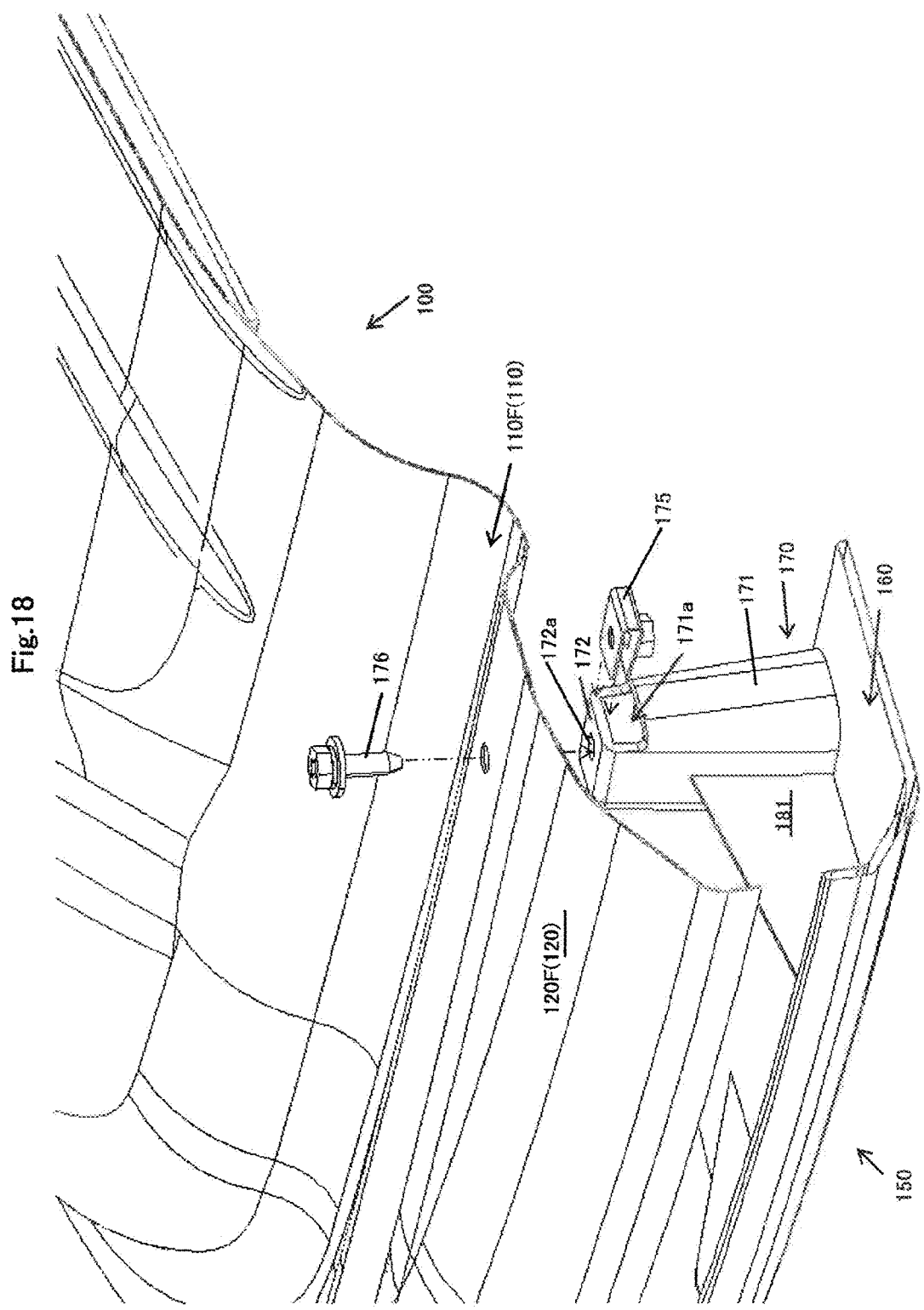

WATERPROOF STRUCTURE FOR OUTER ROOF

FIELD OF THE INVENTION

The present invention relates to a waterproof structure for outer roof, which seals a gap between a outer roof and at least one of upper frames including a front upper frame, a pair of lateral upper frames and a rear upper frame.

BACKGROUND ART

There has been proposed a waterproof structure for outer roof, which seals a gap between an upper frame of a cabin and an outer roof. In this structure, a rubber collar is provided on an upper surface of a bracket that is fixed to the upper frame. Further, an elastically deformable waterproof plate is provided such that an inner periphery thereof is placed on an upper surface of the upper frame and an outer periphery is placed on an upper surface of the rubber collar. The outer roof is fixed to the bracket by means of a fixture tool such that the inner periphery of the waterproof plate is elastically pressed against the upper surface of the upper frame (refer to Patent Document 1 which is mentioned below).

In the conventional outer roof waterproof structure described above, both the gap between the outer roof and the waterproof plate and the gap between the waterproof plate and the upper frame, each communicating the inner space of the cabin with the outside, are sealed in a surface-contacting manner.

However, the gap between the outer roof and the waterproof plate and the gap between the waterproof plate and the upper frame, each communicating the inner space of the cabin with the outside, are sealed only by a single waterproof structure. Therefore, the above configuration still has possibility for improvement in terms of the waterproof properties.

Moreover, in the above conventional outer roof waterproof structure, the outer roof has an exposed free end (edge), which is problematic also in terms of the outer appearance.

PRIOR ART DOCUMENT

Patent Document

Patent document 1: Japanese Unexamined Patent Publication No. H07-156827

DISCLOSURE OF THE INVENTION

The present invention has been achieved in view of the conventional art described above, and an object thereof is to provide a waterproof structure for outer roof, which seals a gap between an outer roof and at least one of upper frames of a cabin that includes a front upper frame, a pair of right and left lateral upper frames and a rear upper frame, the outer roof waterproof structure being capable of achieving improvement of the waterproof property as well as of the quality in outer appearance thereof.

In order to achieve the object, the present invention provides a waterproof structure for outer roof applied to a gap between an outer roof and at least one of upper frames inclusive of a front upper frame, a pair of right and left lateral upper frames and a rear upper frame of a cabin so as to liquid-tightly seal an inner space of the cabin from an outside, wherein the waterproof structure includes a sealing plate that is fixed directly or indirectly to the one upper frame to form a cabin member and has an outward extending region located outside the one upper frame, a first elastic sealing member that is sandwiched between the cabin member and the outer roof, and a second elastic sealing member attached to the outer roof, wherein the outer roof includes a main body region that covers an upper portion of the inner space of the cabin, an outer peripheral region that defines an outer peripheral edge of the main body region, and an outer region that is located outside the outer peripheral region, wherein the second elastic sealing member includes an attached site that is attached to a free end of the outer region, and a sealing site that extends from the attached site so as to be pressed against the outward extending region of the sealing plate, wherein the first elastic sealing member is sandwiched between the cabin member and the outer peripheral region to form a first sealing portion that seals the inner space of the cabin from the outside, and wherein the sealing site of the second sealing member is pressed against the outward extending region to form a second sealing portion that seals the inner space of the cabin from the outside at a position outside the first sealing portion.

The waterproof structure for outer roof makes it possible to enhance both waterproof property and quality in outer appearance, since the first elastic sealing member sandwiched between the outer roof and the cabin member forms the first sealing portion that seals the inner space of the cabin from the outside, and, moreover, the sealing site of the second sealing member, which is attached to the free end of the outer region of the outer roof, is pressed against the outward extending region of the sealing plate, which is fixed to the one upper frame to form the cabin member, to form the second sealing portion that seals the inner space of the cabin from the outside at a position outside the first sealing portion.

In a preferable embodiment, the free end of the outer region extends outward from an outer end of the outward extending region and terminates with facing downward, and the sealing site of the second elastic sealing member extends inward from the attached site in the state where the attached site is attached to the free end of the outer region so that the sealing site is pressed against an upper surface of the outward extending region in the state where the outer roof is attached to the cabin member.

The first elastic sealing member is preferably positioned on or above the upper frame.

In a preferable embodiment, the outer region of the outer roof is detachably fixed to the cabin member by means of a fastening member in a state of being placed on a boss that is arranged on an upper surface of the cabin member, and the boss has a length shorter than a vertical thickness of the first elastic sealing member when having a natural length.

In one embodiment, the one upper frame is embodied by one of the lateral upper frames.

In this case, the outer peripheral region is preferably concaved downward from sites of the main body region and the outer region that are adjacent thereto so that an upper surface of the outer peripheral forms a groove in a vehicle longitudinal direction.

The groove is opened toward a rear side of the outer roof.

In the one embodiment, the waterproof structure for outer roof preferably includes an attachment stay fixed to an inner surface of the one of the lateral upper frames. The attachment stay is configured so as to restrict inward deformation of the first elastic sealing member while supporting a reinforcing frame that connects the one and the other one of the lateral upper frames.

BRIEF DESCRIPTION OF THE DRAWINGS

FIG. 7 is a perspective view of the outer roof.

FIG. 8 is a cross sectional view of the outer roof taken along the vehicle width direction.

FIG. 9 is a cross sectional view of the outer roof taken along the vehicle longitudinal direction.

FIG. 18 is an exploded vertical cross sectional perspective view of an attachment structure for the front cover, which is different from that in the one embodiment.

EMBODIMENT FOR CARRYING OUT THE INVENTION

Described below with reference to the accompanying drawings is a waterproof structure for outer roof according to a preferred embodiment of the present invention.

Figure 1:
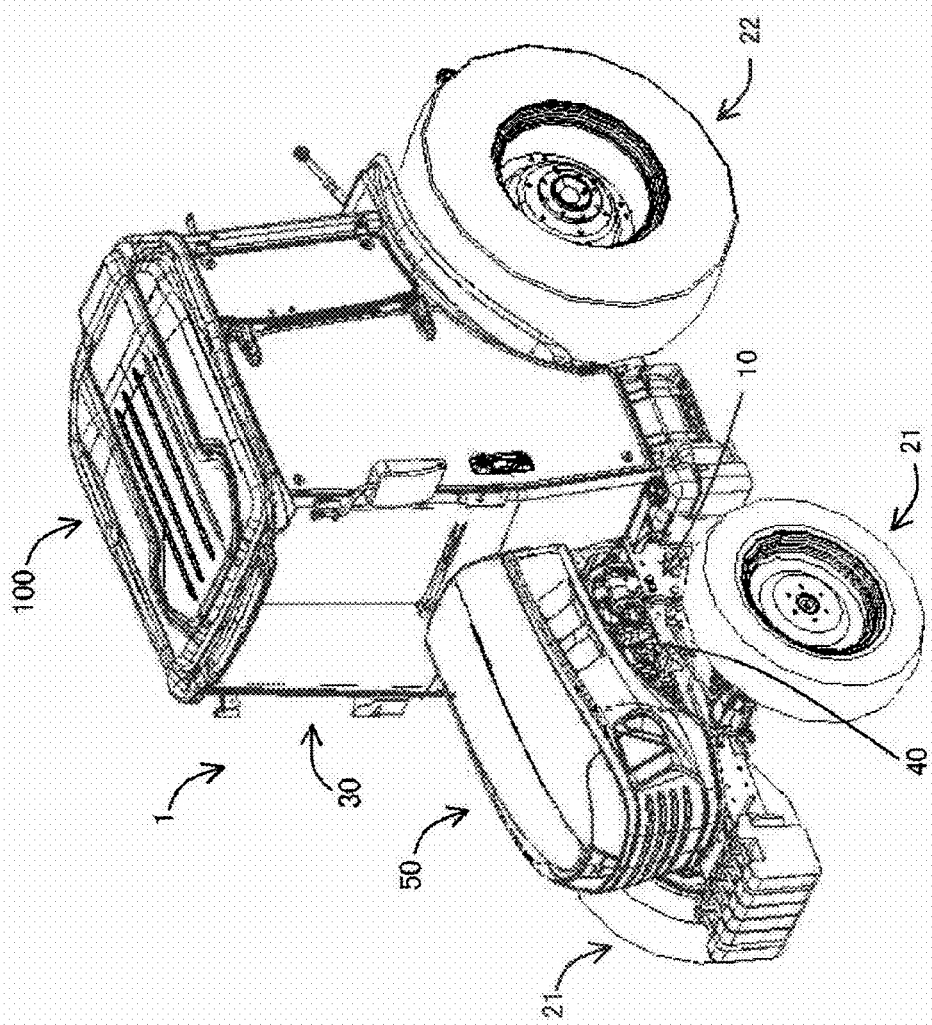
FIG. 1 is a perspective view of a tractor as an example of a working vehicle to which a waterproof structure for outer roof according to the present invention is applied.
Figure 2:
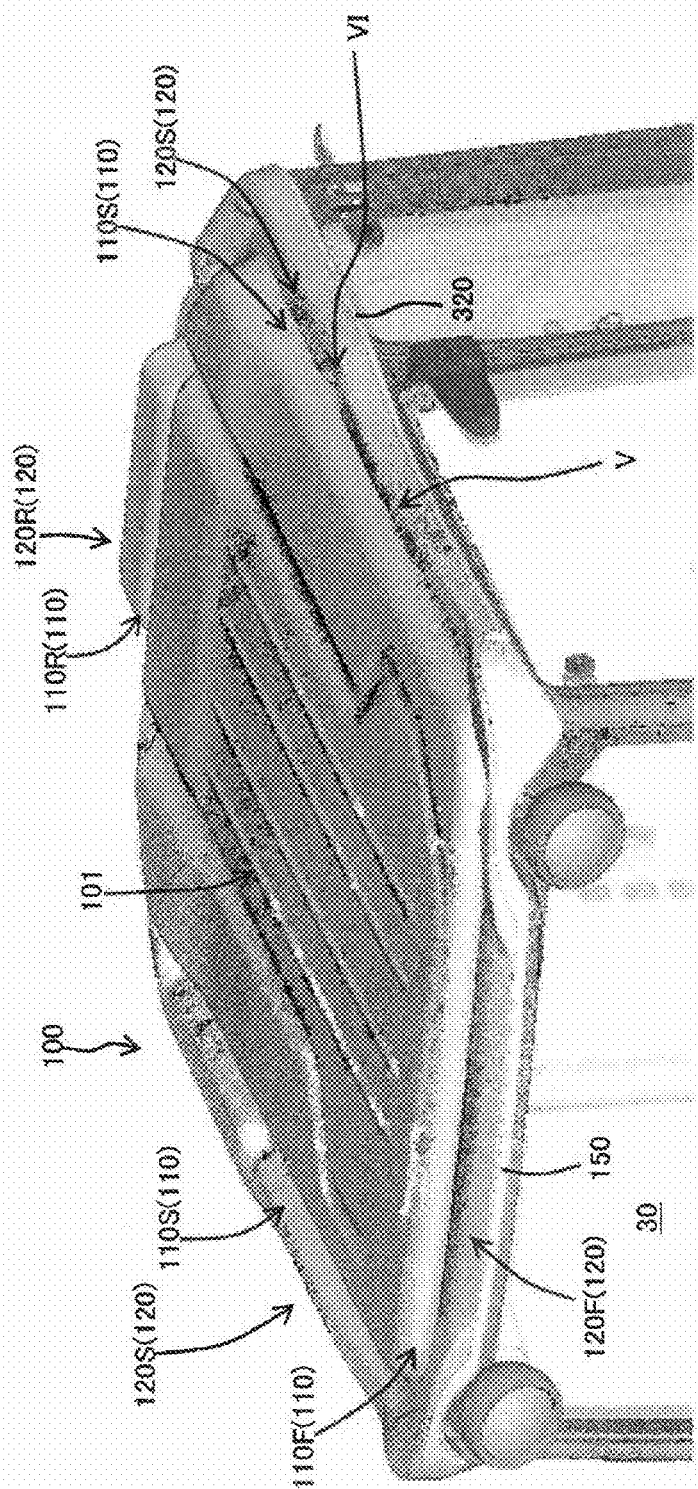
FIG. 2 is a perspective view of the outer roof and the vicinity thereof in the working vehicle.
Figure 3:
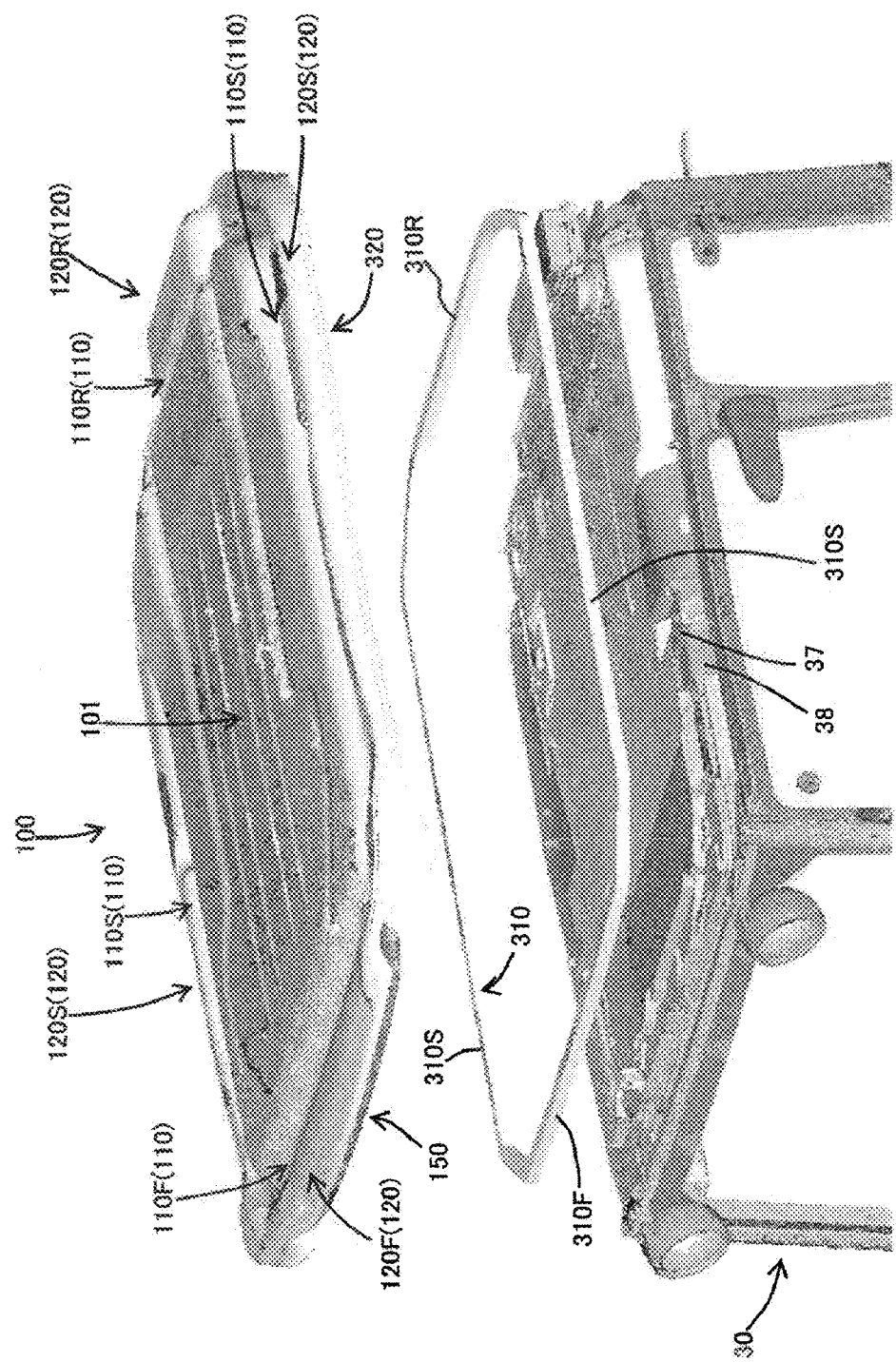
FIG. 3 is a perspective exploded view of the outer root and the vicinity thereof in the working vehicle.

FIG. 1 is a perspective view of a tractor as an example of a working vehicle 1 to which the outer roof waterproof structure according to the present embodiment is applied. FIGS. 2 and 3 are an enlarged perspective view and an enlarged exploded perspective view, respectively, of the outer roof and the vicinity thereof in the working vehicle. It is noted that front lights are not illustrated in FIG. 1.

In the present specification, unless otherwise specified, the "right" and "left" directions are indicated in a reference state where the front portion of the vehicle is viewed from the rear portion.

As shown in FIG. 1, the working vehicle 1 includes a vehicle frame 10, a pair of right and left front wheels 21, a pair of right and left rear wheels 22, a cabin 30, an outer roof 100, an engine unit 40, a hood 50, and a transmission (not shown). The pair of front wheels 21 and the pair of rear wheels 22 are located respectively on the front and rear sides of the vehicle. The cabin 30 is supported by the vehicle frame 10. The outer roof 100 covers the top portion of the cabin 30. The engine unit 40 is located forward of the cabin 30 and is supported by the vehicle frame 10. The hood 50 covers the engine unit 40. The transmission operatively receives rotational power from the engine unit 40.

Figure 4:
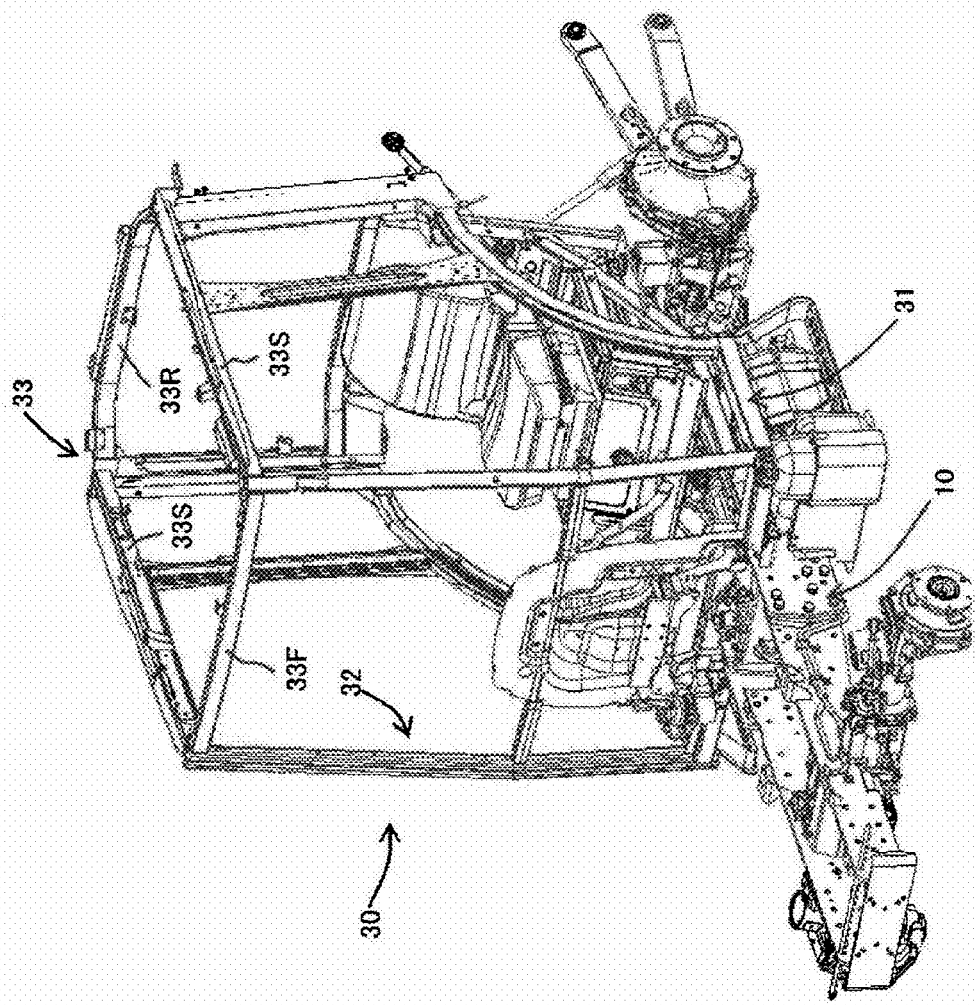
FIG. 4 is a perspective view showing a frame structure on a cabin of the working vehicle.

FIG. 4 is a perspective view of the cabin 30.

As shown in FIG. 4, the cabin 30 includes a lower frame portion 31 supported by the vehicle frame 10, a vertical frame portion 32 standing on the lower frame portion, and an upper frame portion 33 connected to an upper end of the vertical frame portion 32.

The upper frame portion 33 has a front upper frame 33F, a pair of right and left lateral upper frames 33S, and a rear upper frame 33R.

The outer roof waterproof structure according to the present invention is applied to a gap between the outer roof 100 and any one of upper frames including the front upper frame 33F, the pair of right and left lateral upper frames 33S and the rear upper frame 33R.

The present embodiment exemplifies a case where the outer roof waterproof structure is applied to the gap between the outer roof 100 and each of the pair of right and left lateral upper frames 33S.

Figure 5:
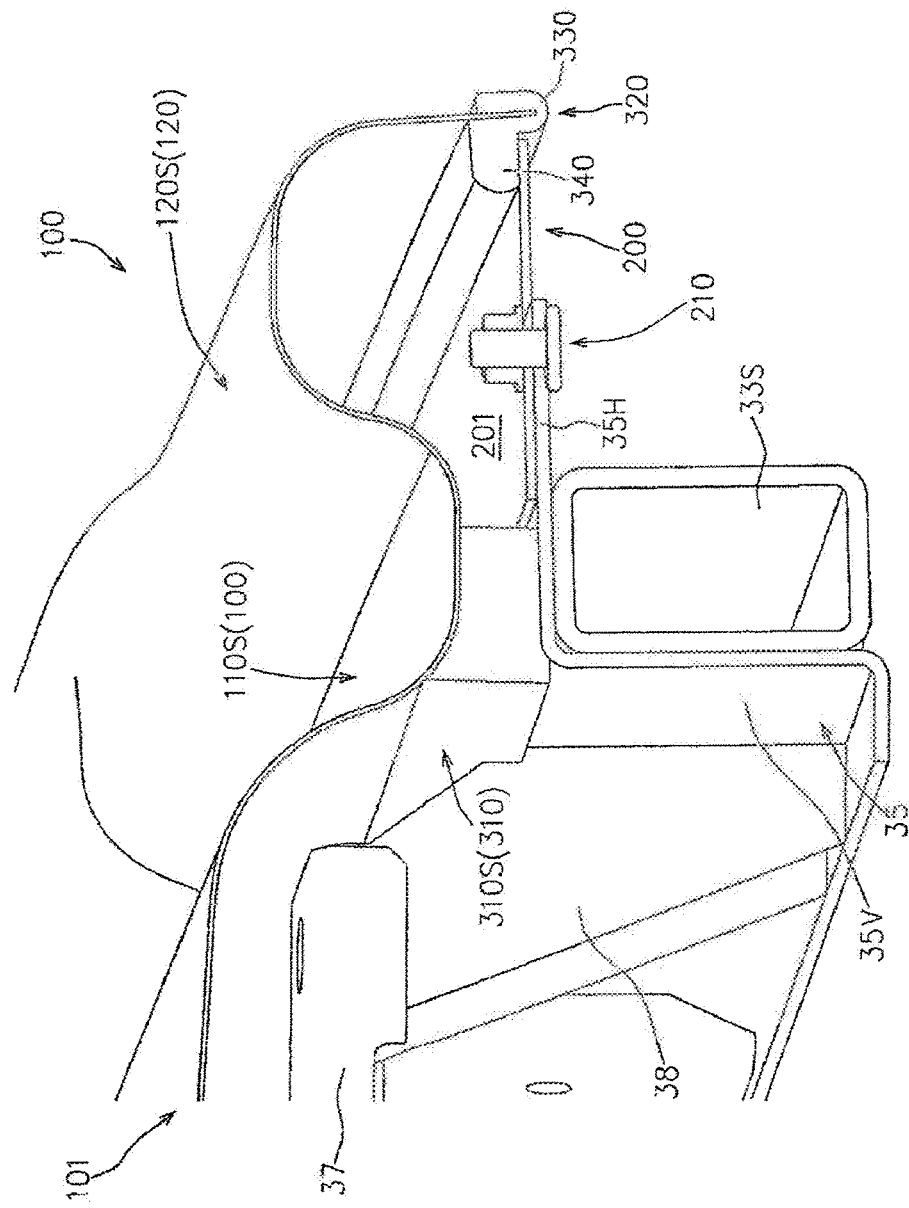
FIG. 5 is a vertical cross sectional perspective view of the outer roof and a lateral upper frame to which one embodiment of the waterproof structure for outer roof according to the present invention, showing a vertical cross section of V portion shown in FIG. 2.

FIG. 5 is a partial perspective view of the working vehicle 1, showing a vertical cross section of V portion shown in FIG. 2.

Figure 6:
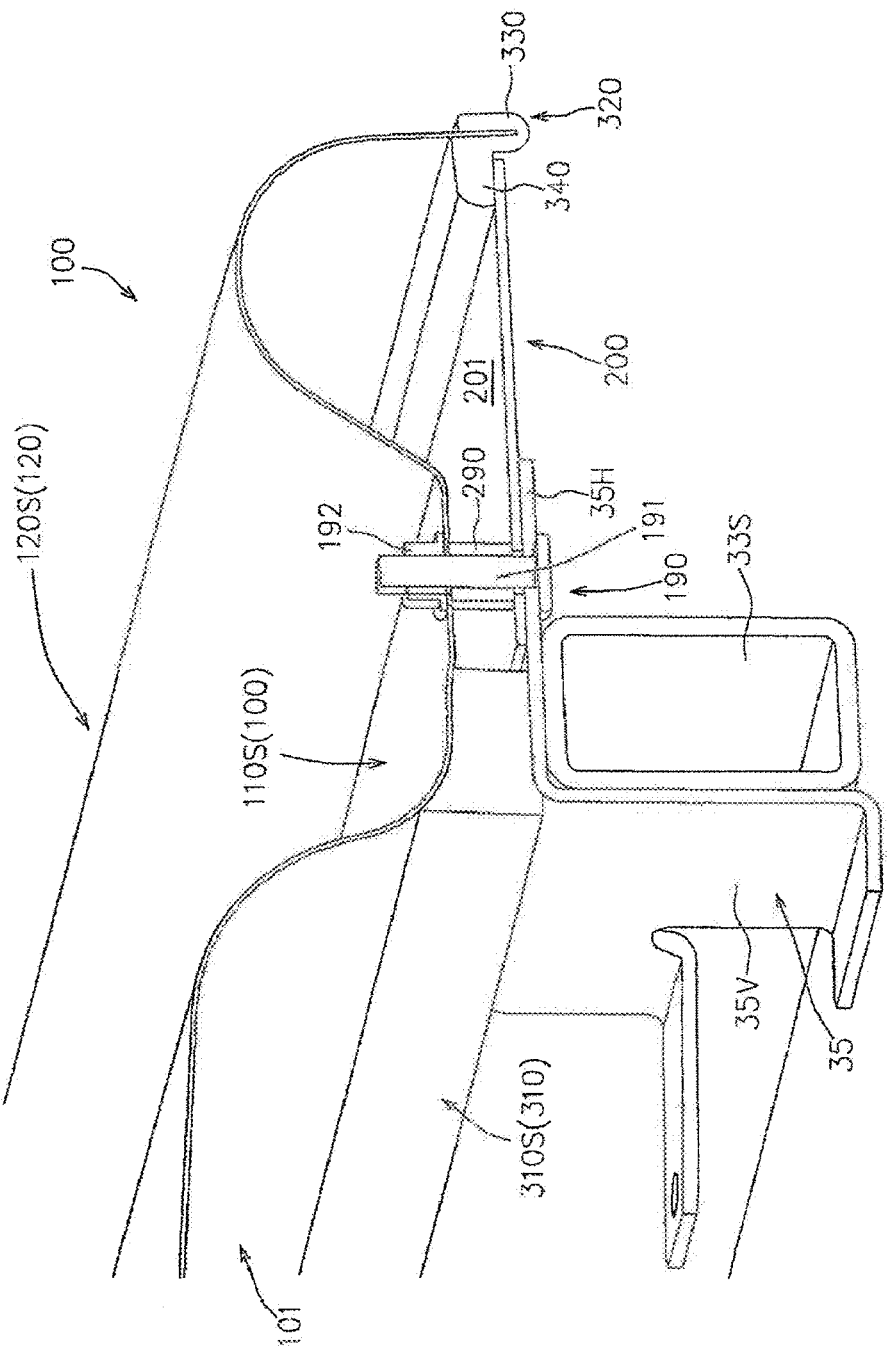
FIG. 6 is a vertical cross sectional perspective view of the outer roof and the lateral upper frame of VI portion shown in FIG. 2.

FIG. 6 is a partial perspective view of the working vehicle 1, showing a vertical cross section of VI portion shown in FIG. 2.

As shown in FIGS. 3, 5, and 6, the outer roof waterproof structure includes a sealing plate 200, a first elastic sealing member 310, and a second elastic sealing member 320.

The sealing plate 200 is fixed directly or indirectly to the left lateral upper frame 33S, which is a corresponding upper frame, so as to configure a cabin member.

More specifically, as shown in FIGS. 5 and 6, the sealing plate 200 is fixed directly or indirectly to the lateral upper frame 33S so as to have an outward extending region 201 that is located outside the lateral upper frame 33S.

In the present embodiment, as shown in FIGS. 5 and 6, a support stay 35 is fixed to the lateral upper frame 33S, and the sealing plate 200 is fixed to the support stay 35.

More specifically, as shown in FIGS. 5 and 6, the support stay 35 has a vertical plate portion 35V and a horizontal plate portion 35H. The vertical plate portion 35V is fixed to an inner surface of the lateral upper frame 33S by welding or the like. The horizontal plate portion 35H extends outward from the upper end of the vertical plate portion 35V so as to pass over the lateral upper frame 33S. The sealing plate 200 is fixed to the horizontal plate portion 35H by means of fastening members 210 configured by a bolt and a nut, or the like.

As shown in FIGS. 2 and 3, the outer roof 100 has a main body region 101, an outer peripheral region 110, and an outer region 120. The main body region 101 covers an upper portion of the inner space of the cabin 30. The outer peripheral region 110 defines an outer peripheral edge of the main body region 101. The outer region 120 is located outside the outer peripheral region 110.

FIG. 7 is a perspective view of the outer roof 100.

FIGS. 8 and 9 are perspective views of the outer roof 100, showing a cross section taken along the vehicle width direction and a cross section taken along the vehicle longitudinal direction, respectively.

It is noted that FIGS. 7 to 9 each illustrate a state where the second elastic sealing member 320 and a front cover 150 to be described below are attached to the outer roof 100.

As shown in FIGS. 7 to 9, the outer peripheral region 110 has a front outer peripheral region 110E located at a front side, lateral outer peripheral regions 110S located at right and left sides, and a rear outer peripheral region 110R located at a rear side.

The outer region 120 has a front outer region 120F located outside (in front of) the front outer peripheral region, lateral outer regions 120S located respectively outside (laterally outside) the lateral outer peripheral regions 110S, and a rear outer region 120R located outside (behind) the rear outer peripheral region 110R.

As shown in FIG. 3, the first elastic sealing member 310 has a front region 310F, right and left lateral regions 310S, and a rear region 310R, so as to form an endless shape.

As shown in FIG. 6, the outer roof 100 is attached to the cabin member by means of fastening members 190 configured by a bolt and a nut or the like, in a state where each of the lateral regions 310S of the first elastic sealing member 310 is sandwiched between the cabin member and corresponding one of the lateral outer peripheral regions 110S of the outer roof 100.

More specifically, in the outer roof waterproof structure according to the present embodiment, each of the lateral regions 310S of the first elastic sealing member 310 is sandwiched between the cabin member and corresponding one of the lateral outer peripheral regions 110S to form a first sealing portion that seals the inner space of the cabin 30 from the outside.

As shown in FIG. 6, there is provided a boss 290 that stands on the upper surface of the cabin member. The outer roof 100 is detachably attached to the cabin member by means of the fastening members 190 in a state of being placed on the upper surface of the boss 290.

The boss 290 is shorter than the vertical thickness of the first elastic sealing member 310 when having a natural length.

In the configuration described above, the first elastic sealing member 310 is compressed in the vertical direction in the state where the outer roof 100 is attached to the cabin member. It is therefore possible to improve the waterproof property of the first sealing portion.

As shown in FIG. 6, in the present embodiment, a bolt 191 serving as one of the fastening members is fixed to the cabin member (the horizontal plate portion 35H of the support stay 35 in the present embodiment) by welding or the like, and the boss 290 is inserted around the bolt 191. The outer roof 100 is provided with an opening that allows the bolt 191 to be inserted therethrough. The outer roof 100 is fastened by means of a nut 192 serving as one of the fastening members 190 in a state where the outer roof 100 is placed on the boss 290 with the bolt 191 being inserted through the opening.

Alternatively, in a different configuration, a boss having an inner peripheral hole provided with a thread can be fixed to the upper surface of the sealing plate 200 or the lower surface of the outer roof by welding or the like, and the outer roof 100 is placed on the threaded boss and is fastened by a bolt inserted from above.

As shown in FIGS. 5 and 6, each of the lateral regions 310S of the first elastic sealing member 310 is preferably disposed on corresponding one of the lateral upper frames 33S.

In this configuration, the lateral regions 310S of the first elastic sealing member 310 are compressed by the lateral outer peripheral regions 110S of the outer roof 100, respectively, in a state where they are retained by the lateral upper frames 33S having high rigidity. Accordingly improved is the waterproof property of the first sealing portion.

It is noted that the first elastic sealing member 310 can be preferably made of an elastic resin material such as rubber or urethane.

As shown in FIGS. 5 to 9 and the like, the second elastic sealing member 320 is attached to a corresponding lateral portion of the outer peripheral edge of the outer roof 100, in other words, a free end of the corresponding outer region 120S of the outer roof 100.

As shown in FIGS. 5 and 6, the second elastic sealing member 320 has an attached site 330 and a sealing site 340. The attached site 330 is attached to the free end of the corresponding lateral outer region 120S. The sealing site 340 extends from the attached site 330 so as to be pressed against the outward extending region 201 of the sealing plate 200.

In other words, in the outer roof waterproof structure according to the present embodiment, the sealing site 340 is pressed against the outward extending region 201 of the sealing plate 200, so as to configure a second sealing portion that seals the inner space of the cabin 30 from the outside at a position outside the first sealing portion.

As described above, the outer roof waterproof structure according to the present embodiment has the first sealing portion configured by the first elastic sealing member 310 as well as the second sealing portion configured by the second elastic sealing member 320 that is attached to the outer peripheral edge of the outer roof 100. Therefore, the waterproof properties of the cabin 30 can be enhanced while the quality in outer appearance of the outer roof 100 is also improved.

As shown in FIGS. 5 and 6, in the outer roof waterproof structure according to the present embodiment, the free end of each of the lateral outer regions 120S extends outward from the outer end of the outward extending region 201 of the sealing plate 200 and terminates with facing downward.

The sealing site 340 of the second elastic sealing member 320 extends inward from the attached site 330 so as to be pressed against the upper surface of the outward extending region 201 in the state where the outer roof 100 is attached to the cabin member.

In this configuration, the second elastic sealing member 320 can be reliably pressed against the sealing plate 200, even in a case where the position of the outer peripheral edge of the outer roof 100 relative to the cabin member is displaced in the vertical direction and/or in the vehicle width direction due to manufacturing variations or assembling misalignments of the outer roof 100 and/or the cabin member.

The second elastic sealing member 320 can be preferably made of an elastic resin material such as rubber or urethane.

It is noted that the second elastic sealing member 320 can be formed into various shapes as long as it integrally includes the attached site 330 and the sealing site 340.

Figure 10A:
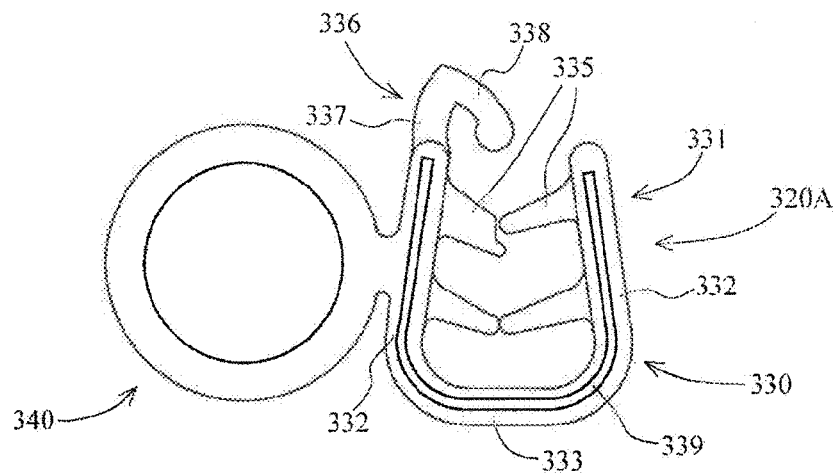
FIGS. 10A to 10C are end views of second elastic sealing members of the waterproof structure for outer roof.

FIG. 10A is an end of a first modified example 320A of the second elastic sealing member 320.

As shown in FIG. 10A, the attached site 330 has a hollow main body portion 331 and first disengagement preventing pieces 335. The main body portion 331 has a pair of side walls 332 and an end wall 333. The pair of side walls 332 face each other with a gap being provided therebetween. The end wall 333 connects first ends of the pair of side walls 332. The main body portion 331 is opened at second ends of the pair of side walls 332 so as to have a U-letter shape in cross section. The first disengagement preventing pieces 335 extend inward from the inner peripheral surfaces of the pair of side walls 332, respectively.

Each of the first disengagement preventing pieces 335 is inclined such that, a free end is positioned forward of a proximal end in a direction of inserting the outer peripheral edge of the outer roof 100.

FIG. 10A also illustrates a metal core 339 that is provided inside the main body portion.

As shown in FIG. 10A, the attached site 330 is further provided with a second disengagement preventing piece 336 that extends outward from the main body portion 331 so as to be located in the vicinity of the opened portion of the main body portion 331.

The second disengagement preventing piece 336 has a support portion 337 and a contact portion 338. The support portion 337 extends from one of the pair of side walls 332 of the main body portion 331 in a direction opposite to the direction of inserting the outer peripheral edge. The contact portion 338 extends from the free end of the support portion 337 in a direction toward the other one of the pair of side walls 332 as well as in the direction of inserting the outer peripheral edge.

In the first modified example 320A shown in FIG. 10A, the sealing site 340 has a substantially circular hollow shape in cross section.

Obviously, the sealing site 340 may have any one of various hollow shapes such as a rectangular shape and an elliptical shape in cross section.

Figure 10B:
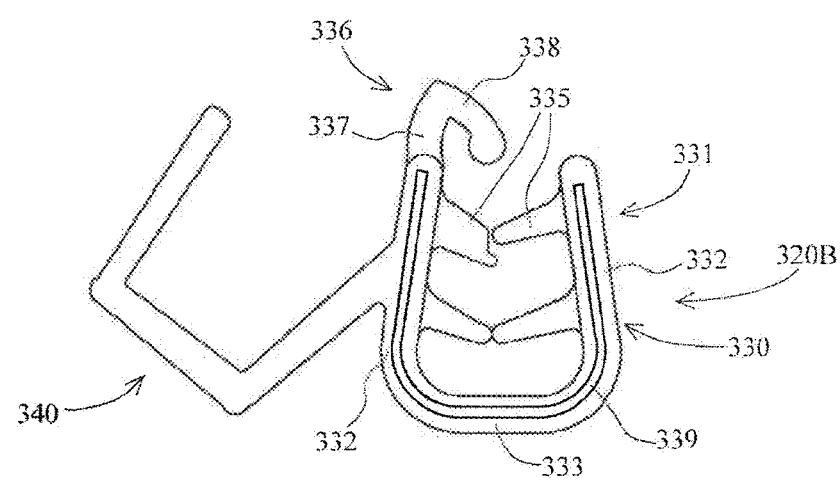
Figure 10C:
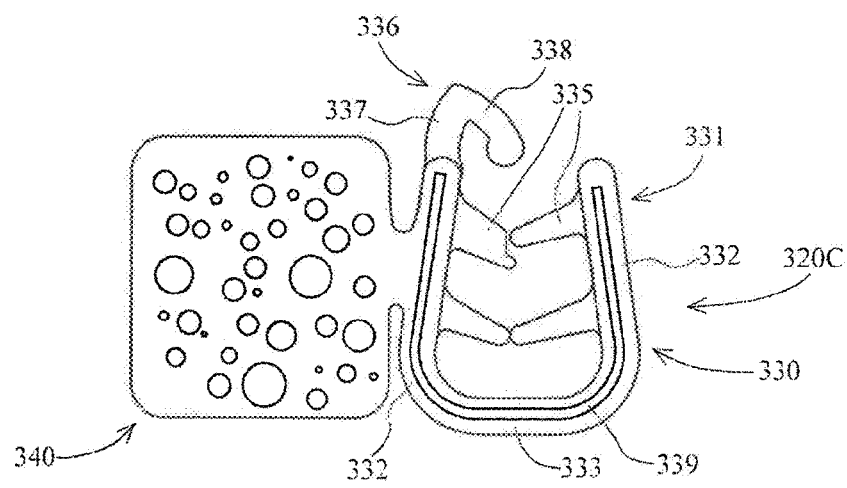

FIGS. 10B and 10C are end views of other modified examples 320B and 320C of the second elastic sealing member 320, respectively.

In the example 320B shown in FIG. 10B, the sealing site 340 is formed into a shape having a proximal end connected to the main body portion 331 and a distal end being a free end.

In the example 320B shown in FIG. 10B, the sealing site 340 has a hook shape so as to have bent portions between the proximal end and the distal end in cross section. Obviously, the sealing site 340 may alternatively have a curved shape from the proximal end to the distal end in cross section.

In the example 320C shown in FIG. 10C, the sealing site 340 has a solid shape.

In this case, the sealing site 340 preferably has a foamed portion. The sealing site 340 shown in FIG. 10C is made of a material having a high foaming factor, for example (such as urethane foam).

As described earlier, in the present embodiment, the outer roof waterproof structure is applied to each of the gaps between the right and left lateral upper frames 33S and the outer roof 100.

As shown in FIGS. 2, 7, and the like, in such a case, the lateral outer peripheral regions 110S are preferably concaved downward from sites of the main body region 101 and the outer region side portions 120S that are adjacent thereto, such that the upper surface of each of the lateral outer peripheral regions 110S has a groove in the vehicle longitudinal direction. Further, the grooves are opened toward the rear end of the outer roof 100.

The configuration described above allows water falling on the upper surface of the outer roof 100 to be effectively guided along the grooves and discharged backward during the forward travel that occupies the majority of the driving time of the working vehicle 1.

In the present embodiment, as shown in FIGS. 2, 7 and the like, the front outer peripheral region 110F is also concaved downward. Accordingly, a groove configured by the front outer peripheral region 110F and the grooves configured by the right and left lateral outer peripheral regions 110S are in communication with each other so as to provide a unified outer peripheral groove.

As shown in FIGS. 3 and 5, the working vehicle 1 includes a reinforcing frame 37 that indirectly connects intermediate sites in the longitudinal direction of the right and left lateral upper frames 33S.

More specifically, as shown in FIG. 5, an attachment stay 38 is fixed to the inner surface of one of the lateral upper frames 33S. Although not shown, another attachment stay is fixed to the inner surface of the other one of the lateral upper frames 33S in a similar manner.

The reinforcing frame 37 is connected to the right and left attachment stays 38.

As shown in FIG. 5, in the configuration described above, the attachment stays 38 can restrict inward deformation of the first elastic sealing member 310.

The above configuration prevents inward, elastic deformation of the first elastic sealing member 310 with no additional member being required, and improves contact properties between the outer roof 100 and the upper surface of the first elastic sealing member 310 as well as between the lower surface of the first elastic sealing member 310 and the corresponding lateral upper frames 33S.

Described below is the front portion of the outer roof 100.

As described earlier, the front cover 150 is attached to the outer roof 100.

More specifically, the front cover 150 is attached to the free end of the front outer region 120F (the outer peripheral edge of the front portion of the outer roof 100).

Figure 11:
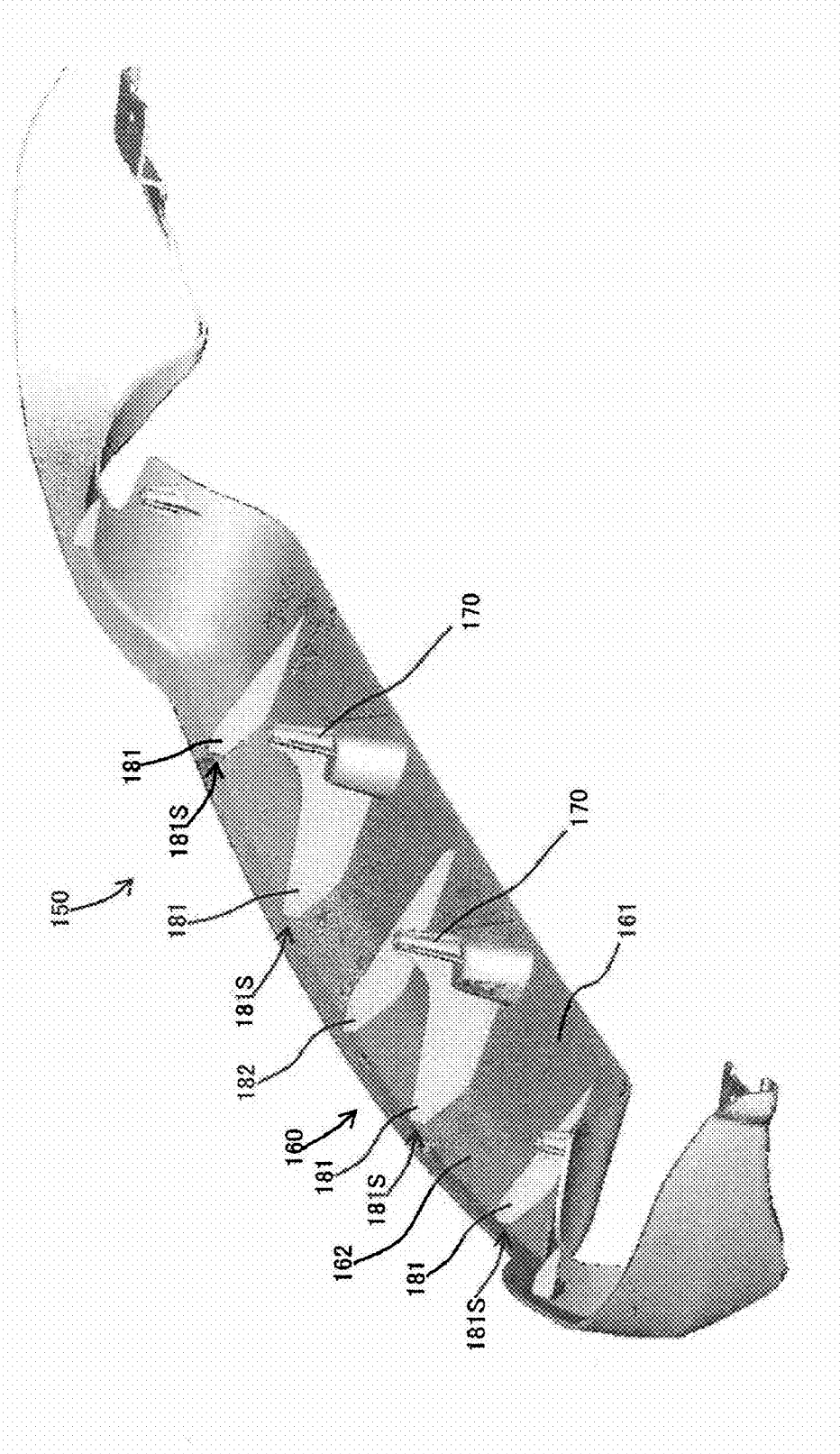
FIG. 11 is a perspective view of front cover that is mounted to a front portion of the outer roof.

FIG. 11 is a perspective view of the front cover 150.

As shown in FIG. 11, the front cover 150 includes a cover main body 160, attachment bosses 170, and first and second ribs 181 and 182. The cover main body 160 has a bottom wall 161 and a front wall 162, and is opened at upper and rear ends. The attachment bosses 170 stand on the bottom wall 161. The first and second ribs 181 and 182 are provided so as to be across the boundary between the bottom wall 161 and the front wall 162.

Figure 12:
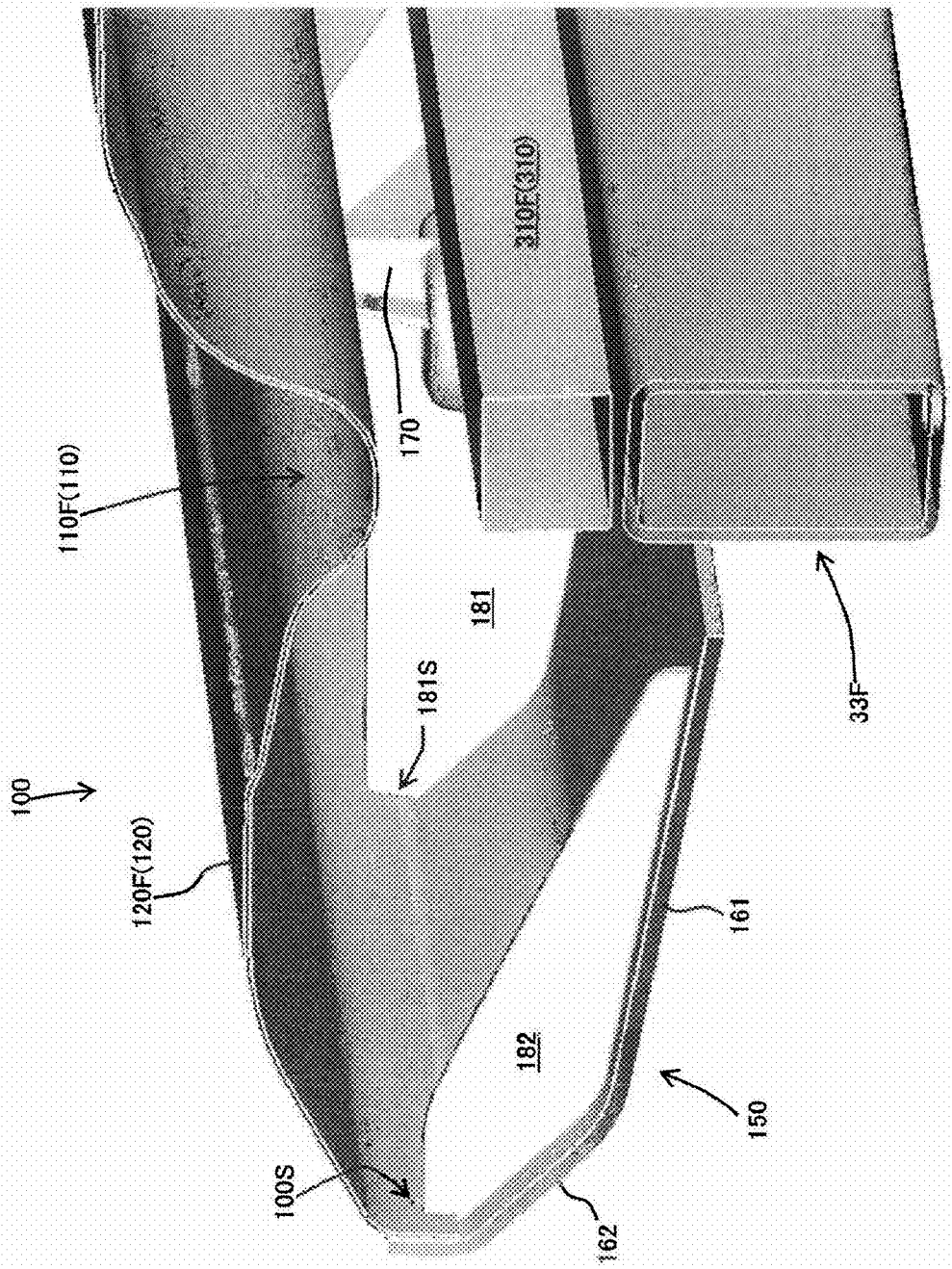
FIG. 12 is an exploded perspective view of the front portion of the outer roof, which is cut in the vertical direction.

FIG. 12 is an exploded perspective view of the front portion of the outer roof 100, which is cut in the vertical direction.

As shown in FIGS. 11 and 12, there is provided, between each of the first ribs 181 and the front wall 162, a front cover slit 181S that is opened upward. The front portion of the outer peripheral edge of the outer roof 100 is engaged into the front cover slits 181S.

On the other hand, as shown in FIG. 12, an outer roof slit 100S that is opened downward is provided in the front portion of the outer peripheral edge of the outer roof 100, at a position corresponding to the second rib 182. The second rib 182 is engaged into the outer roof slit 100S.

More specifically, the relative shift in the vehicle longitudinal direction is prevented between the front cover 150 and the outer roof 100 due to the engagement of the front portion of the outer peripheral edge of the outer roof 100 into the front cover slits 181S, and the relative shift in the vehicle width direction is prevented between the front cover 150 and the outer roof 100 due to the engagement of the second rib 182 into the outer roof slit 100S.

The front cover 150 and the outer roof 100 are detachably connected to each other by means of a bolt (not shown) to be screwed into a screw hole in each of the attachment bosses 170, in the state where the relative shift between the front cover 150 and the outer roof 100 is prevented in the vehicle longitudinal direction as well as in the vehicle width direction.

As shown in FIG. 12, the outer roof 100, to which the front cover 150 is attached, is detachably fixed onto the cabin member by means of a fastening member (not shown) such that the front region 310F of the first elastic sealing member 310 is sandwiched between the front upper frame 33F and the front outer peripheral region 110F.

Described next is the rear portion of the outer roof 100.

As shown in FIGS. 7 to 9, the rear portion of the outer roof 100 has a first region 100R(1), a pair of right and left second regions 100R(2), and a pair of right and left third regions 100R(3). The first region 100R(1) is located at the center in the vehicle width direction. The pair of second regions 100R(2) are located at respective ends in the vehicle width direction of the first region 100R(1). The pair of third regions 100R(3) are located respectively outside the pair of second regions 100R(2) in the vehicle width direction.

Figure 13:
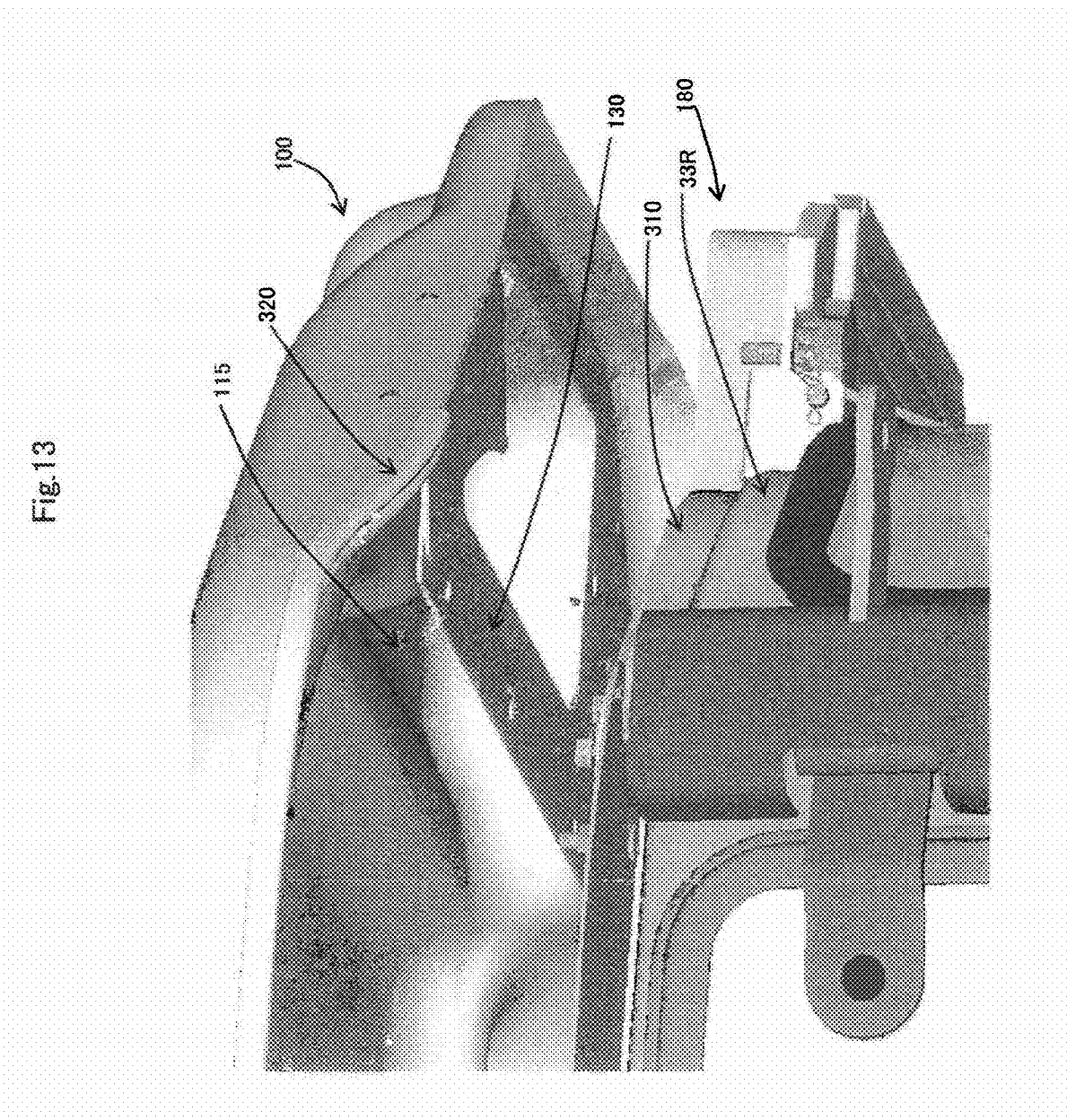
FIG. 13 is an exploded perspective view of a rear portion of the outer roof.

FIG. 13 is an exploded perspective view of the rear portion of the outer roof 100.

Figure 14:
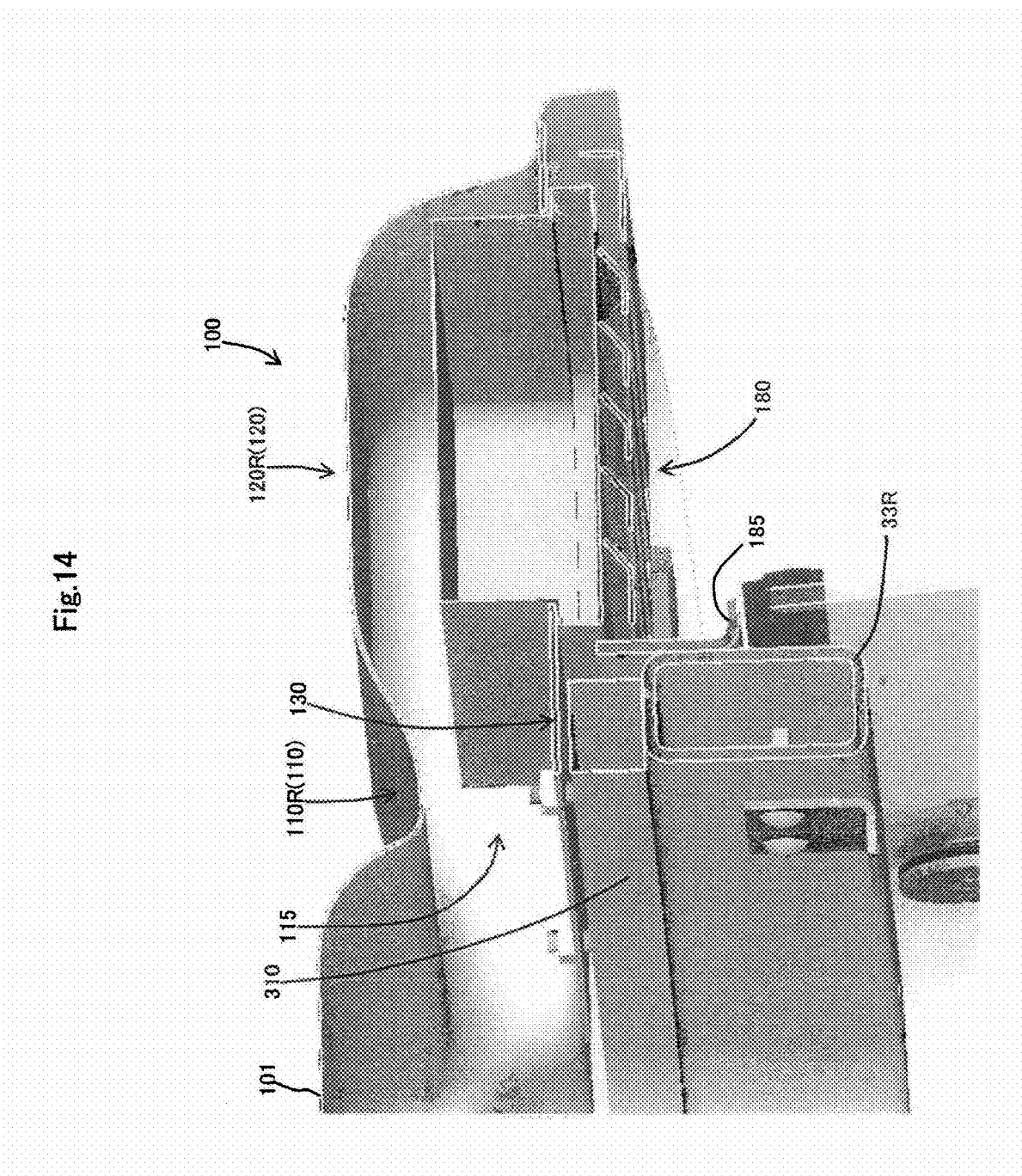
FIG. 14 is a perspective view of a first region of the rear portion of the outer roof, which is cut in the vertical direction.
Figure 15:
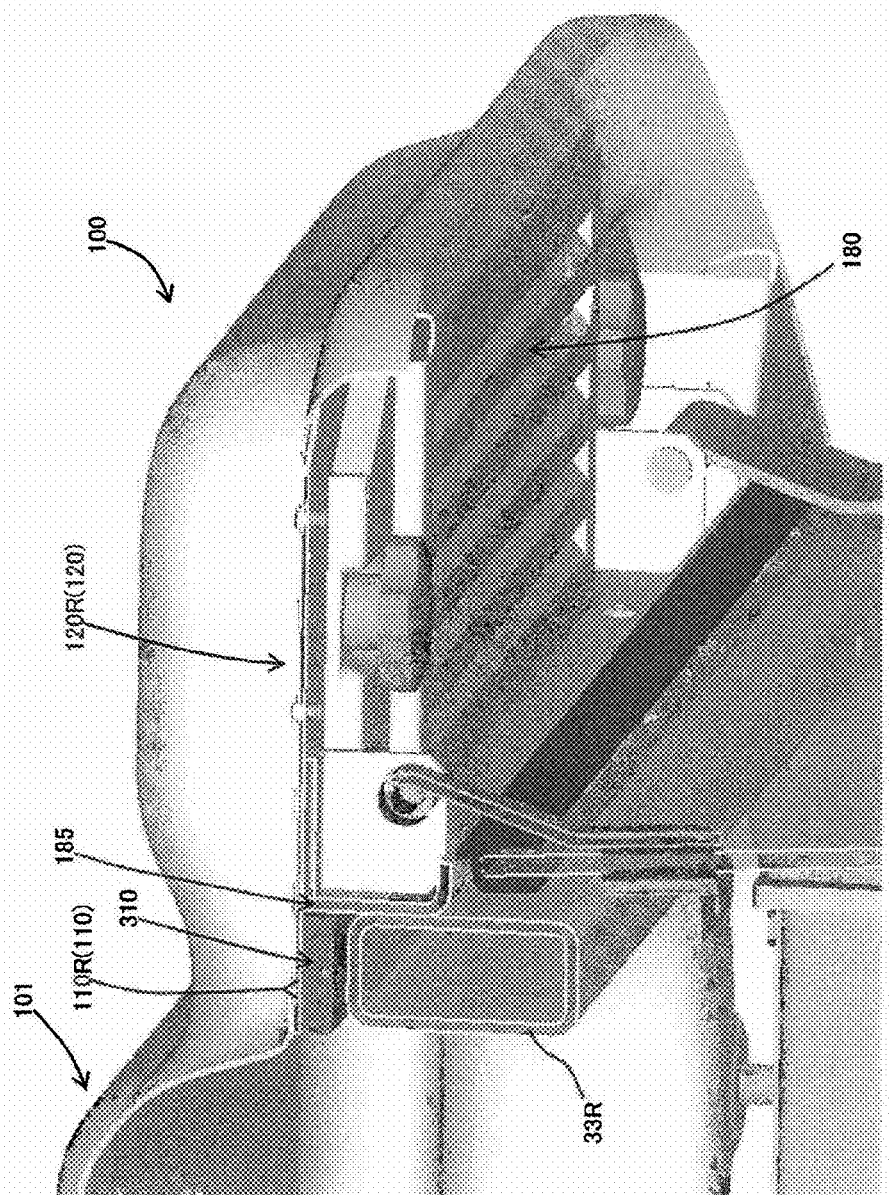
FIG. 15 is a perspective view of a second region of the rear portion of the outer roof, which is cut in the vertical direction.
Figure 16:
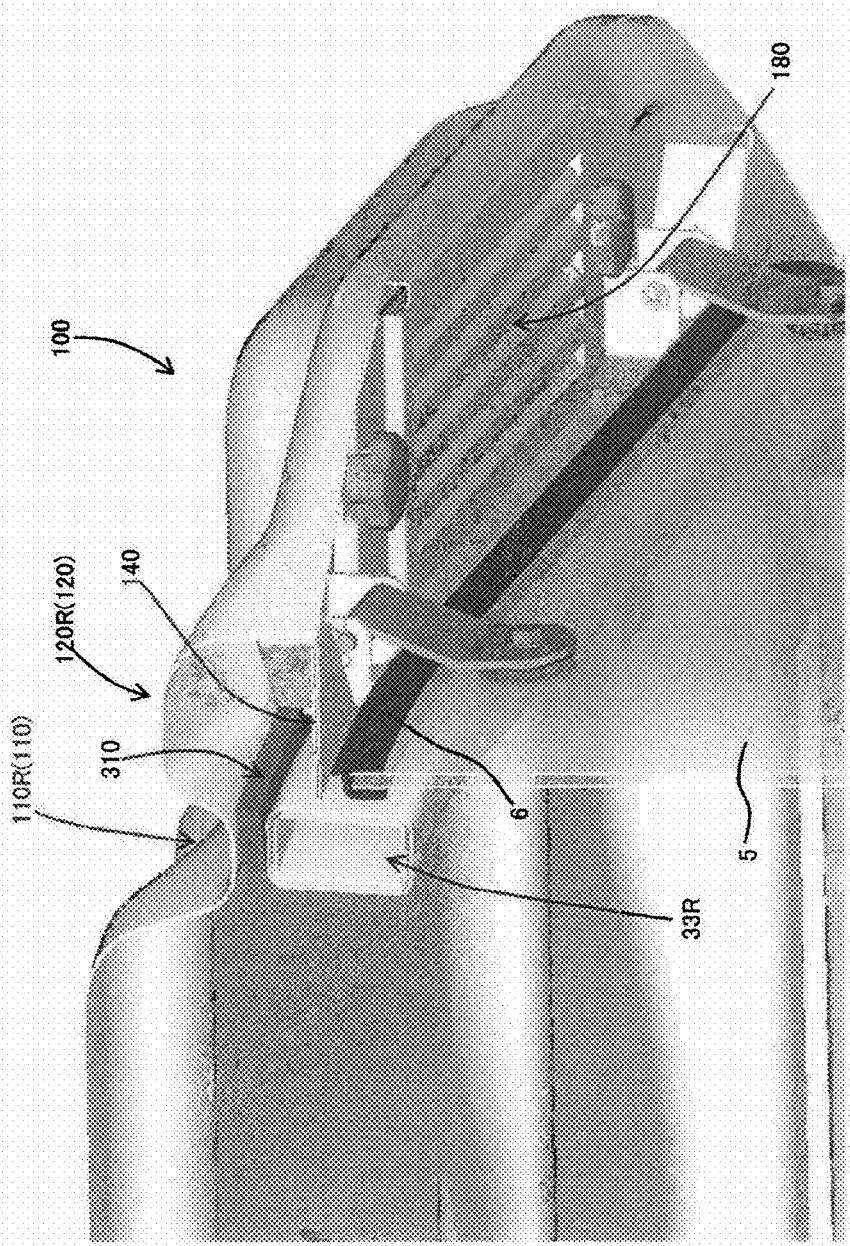
FIG. 16 is a perspective view of a third region of the rear portion of the outer roof, which is cut in the vertical direction.

FIGS. 14 to 16 are perspective views of the first to third regions 100R(1) to 100R(3), respectively, which are cut in the vertical direction.

As shown in FIGS. 13 and 14, in the first region 100R(1), the rear outer peripheral region 110R is located above and spaced apart from the first elastic sealing member 310 so as to provide an air guide gap 115 between the rear outer peripheral region 110R and the first elastic sealing member 310. Further, the rear outer region 120R is configured to surround a filter unit 180 that is attached to the rear upper frame 33R with an attachment stay 185 being interposed therebetween.

FIGS. 13 and 14 also illustrate an outer roof sealing plate 130 that is fixed to the outer roof 100 so as to seal the gap between the filter unit 180 and the first elastic sealing member 310.

As shown in FIGS. 13 and 15, in each of the second regions 100R(2), the lower surface of the rear outer peripheral region 110R is directly or indirectly pressed against the upper surface of the first elastic sealing member 310.

In each of the second regions 100R(2), the upper surfaces of the rear outer peripheral region 110R and the rear outer region 120R configure a discharge portion that discharges backward, water flowing in the groove provided by the front outer peripheral region 110F as well as in the grooves provided by the right and left lateral outer peripheral regions 110S.

More specifically, as shown in FIG. 7 and the like, in the outer roof 100, the upper surface of each of the second regions 100R(2) in the rear outer region 120R is concaved downward from the upper surfaces of the first and third regions 100R(1) and 100R(3) in the rear outer region 120R, so that water flowing in the groove provided by the upper surface of each of the lateral outer peripheral regions 110S flows over the upper surface of the second region 100R(2) in the rear outer peripheral region 110R so as to be discharged backward. Configured therefore is the discharge portion.

As shown in FIG. 16, in each of the third regions 100R(3), the lower surface of the rear outer peripheral region 110R is directly or indirectly pressed against the upper surface of the first elastic sealing member 310.

As shown in FIGS. 7 and 16, the upper surface of each of the third regions 100R(3) in the rear outer peripheral region 110R is concaved downward from the sites of the main body region 101 and the third region 100R(3) of the rear outer region that are adjacent thereto, so as to provide a groove that communicates with the groove provided by corresponding one of the right and left lateral outer peripheral regions 110S.

As shown in FIG. 16, in the present embodiment, a shield plate 140 is fixed to the third regions 100R(3) in the rear outer region 120R.

The shield plate 140 is provided so as to cover an upper space of an elastic sealing member 6 that is disposed at an upper end of a rear hatch 5 in the working vehicle 1. Therefore, dust is prevented from adhering to the upper end of the elastic sealing member 6.

The shield plate 140 can be fixed to the cabin member such as the rear upper frame 33R, instead of being fixed to the outer roof 100.

In the rear outer region 120R, the free ends in all of the first to third regions 100R(1) to 100R(3) preferably terminate with facing downward at positions below the first elastic sealing member 310. This configuration prevents external water from directly hitting the first elastic sealing member 310, which therefore improves the sealing property of the first elastic sealing member 310.

As described above, in the present embodiment, the second elastic sealing member 320 is not provided in the front and rear portions of the outer roof 100.

Accordingly, even if water enters through the second sealing portion configured by the second elastic sealing member 320, such water flows in the space defined by the right and left lateral outer regions 120S of the outer roof 100 and the sealing plate 200, so as to be then discharged from the front end and/or the rear end of the vehicle.

In the present embodiment, as shown in FIG. 5, the sealing plate 200 is fixed to the support stay 35 serving as the cabin member by means of the fastening members 210. In this structure, the bolt provided separately from the support stay 35 is used as one of the fastening members 210. Alternatively, it is possible to adopt a different attachment structure in place of the above structure.

Figure 17:
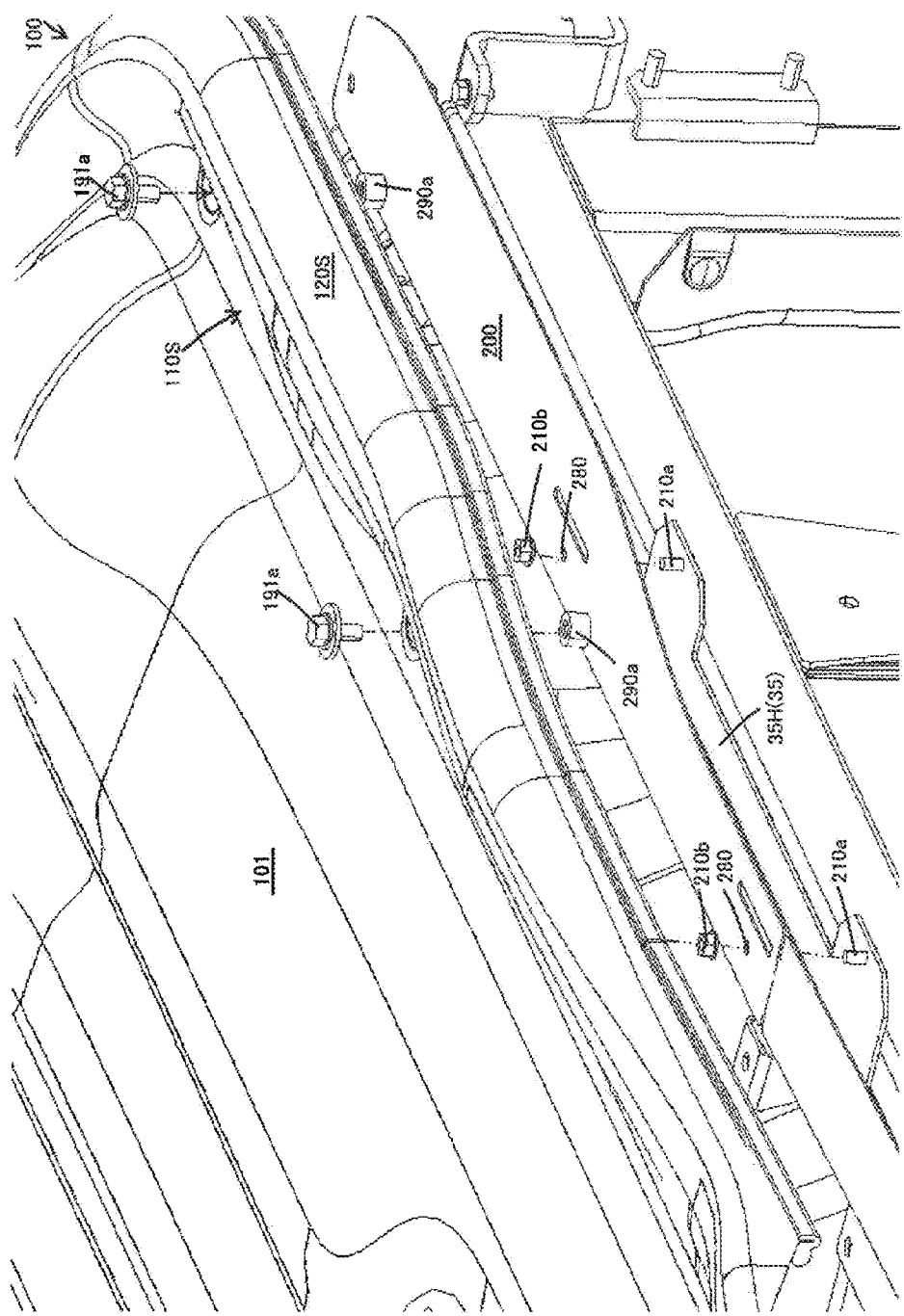
FIG. 17 is an exploded perspective view of an attachment structure for the outer roof, which is different from that in the one embodiment.

FIG. 17 is an exploded perspective view of the outer roof 100, the sealing plate 200, and the support stay 35, to which the different attachment structure is adopted.

In the attachment structure shown in FIG. 17, stays 210a each provided with a bolt are fixed to the upper surface of the support stay 35 by welding, and the sealing plate 200 is provided with fastening holes 280 that allow the stays 210a to be inserted therethrough, respectively.

In the state where each of the stays 210a is inserted through the corresponding fastening hole 280, a nut 210b is screwed around the bolt of the stay 210a from above the sealing plate 200, so that the sealing plate 200 is fixed to the support stay 35.

In the present embodiment, as shown in FIG. 6, the outer roof 100 is fixed to the sealing plate 200 by fastening the nut 192 with the bolt 191 that is fixed to the sealing plate 200 and is inserted into the boss in a state where the outer roof 100 is placed on the sealing plate 200 serving as the cabin member, with the boss 290 being interposed therebetween.

The above structure for attaching the outer roof 100 can be replaced with another attachment structure shown in FIG. 17. Specifically, bosses 290a each provided with a screw hole are fixed to the upper surface of the sealing plate 200 by welding, and bolts 191a are screwed into the screw holes in the bosses 290a from above the outer roof 100 through corresponding openings provided in the outer roof 100, respectively, so that the outer roof 100 is fixed to the sealing plate 200.

Furthermore, the front cover 150 can be fixed to the outer roof 100 by means of an attachment structure that is different from the attachment structure of the present embodiment.

FIG. 18 is an exploded perspective view, in a state of being cut in the vertical direction, of the outer roof 100 and the front cover 150 that are connected to each other by means of a different attachment structure.

In the attachment structure shown in FIG. 18, the front cover 150 is fixed to the outer roof 100 by means of a speed nut 175 that is attached to the attachment boss 170 of the front cover 150.

More specifically, the attachment boss 170 has a hollow peripheral wall 171 and an upper wall 172. The peripheral wall 171 stands on the cover main body 160. The upper wall 172 closes the upper end of the peripheral wall 171.

The peripheral wall 171 is provided with a cutout 171a that allows the speed nut 175 to be attached to the upper wall 172.

Further, the upper wall 172 is provided with an opening 172*a* that allows a bolt 176 screwed into the speed nut 175 to be inserted therethrough.

| DESCRIPTION OF THE REFERENCE NUMERALS | |
|---|---|
| 30 | Cabin |
| 33F | Front upper frame |
| 33S | Lateral upper frame |
| 33R | Rear upper frame |
| 37 | Reinforcing frame |
| 38 | Attachment stay |
| 100 | Outer roof |
| 101 | Main body region |
| 110 | Outer peripheral region |
| 110S | Lateral outer peripheral region |
| 120 | Outer region |
| 120S | Lateral outer region |
| 200 | Sealing plate |
| 201 | Outward extending region |
| 290 | Boss |
| 310 | First elastic sealing member |
| 320 | Second elastic sealing member |
| 330 | Attached site |
| 340 | Sealing site |

The invention claimed is:

1. A waterproof structure for an outer roof applied to a gap between the outer roof and at least one of upper frames inclusive of a front upper frame, a pair of right and left lateral upper frames and a rear upper frame of a cabin so as to liquid-tightly seal an inner space of the cabin from an outside, the waterproof structure includes:
   a sealing plate that is fixed directly or indirectly to the one upper frame to form a cabin member and has an outward extending region located outside the one upper frame, a first elastic sealing member that is sandwiched between the cabin member and the outer roof, and a second elastic sealing member attached to the outer roof,
   wherein the outer roof includes a main body region that covers an upper portion of the inner space of the cabin, an outer peripheral region that defines an outer peripheral edge of the main body region, and an outer region that is located outside the outer peripheral region,
   wherein the second elastic sealing member includes an attached site that is attached to a free end of the outer region, and a sealing site that extends from the attached site so as to be pressed against the outward extending region of the sealing plate,
   wherein the first elastic sealing member is sandwiched between the cabin member and the outer peripheral region to form a first sealing portion that seals the inner space of the cabin from the outside, and
   wherein the sealing site of the second sealing member is pressed against the outward extending region to form a second sealing portion that seals the inner space of the cabin from the outside at a position outside the first sealing portion.

2. A waterproof structure for an outer roof according to claim 1,
   wherein the free end of the outer region extends outward from an outer end of the outward extending region and terminates with facing downward, and
   wherein the sealing site of the second elastic sealing member extends inward from the attached site in the state where the attached site is attached to the free end of the outer region so that the sealing site is pressed against an upper surface of the outward extending region in the state where the outer roof is attached to the cabin member.

3. A waterproof structure for an outer roof according to claim 1, wherein the first elastic sealing member is positioned on or above the one upper frame.

4. A waterproof structure for an outer roof according to claim 1, wherein the outer region of the outer roof is detachably fixed to the cabin member by means of a fastening member in a state of being placed on a boss that is arranged on an upper surface of the cabin member, and
   wherein the boss has a length shorter than a vertical thickness of the first elastic sealing member when having a natural length.

5. A waterproof structure for an outer roof according to claim 1, wherein the one upper frame is embodied by one of the lateral upper frames, wherein the outer peripheral region is concaved downward from sites of the main body region and the outer region that are adjacent thereto so that an upper surface of the outer peripheral forms a groove in a vehicle longitudinal direction, and
   wherein the groove is opened toward a rear side of the outer roof with respect to the vehicle longitudinal direction.

6. A waterproof structure for an outer roof according to claim 5, wherein an attachment stay is fixed to an inner surface of the one of the lateral upper frames, and
   wherein the attachment stay restricts inward deformation of the first elastic sealing member while supporting a reinforcing frame that connects the one and the other one of the lateral upper frames.

* * * * *